Oct. 20, 1970      R. GLIMPEL      3,534,970
SELF-LOCKING FIXTURES
Filed April 22, 1968      3 Sheets-Sheet 1
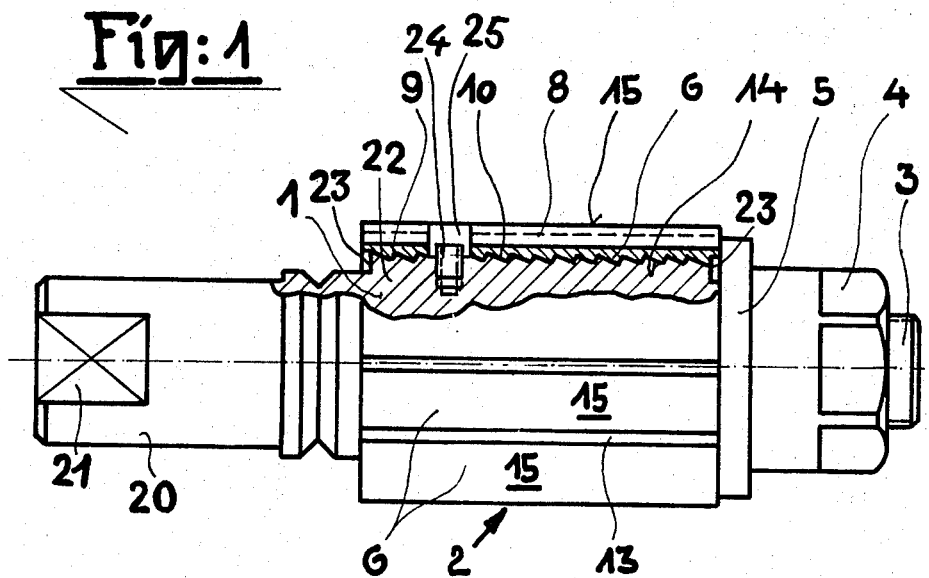
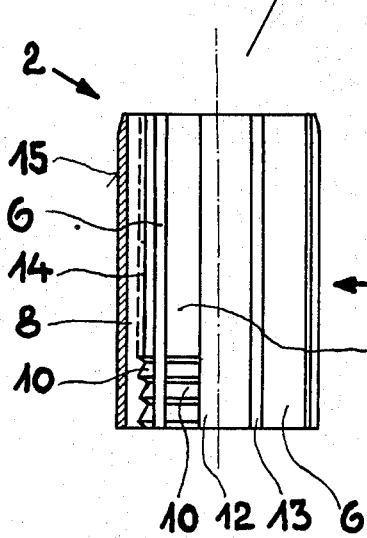
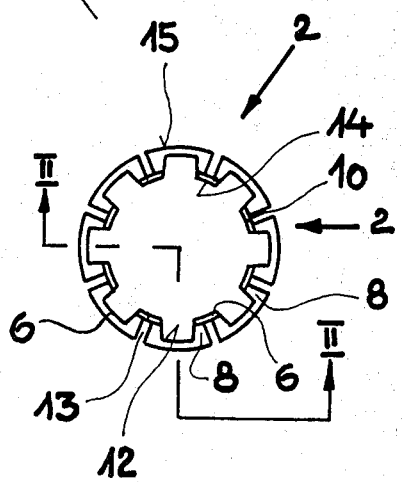
*INVENTOR.*
RICHARD GLIMPEL
BY Glascock, Downing & Seebold
ATTORNEYS

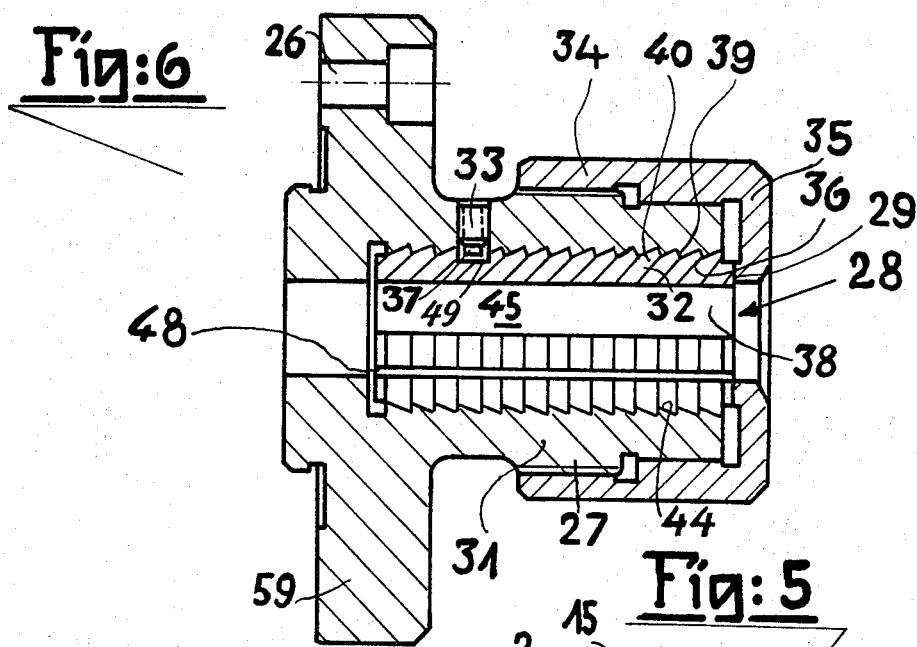
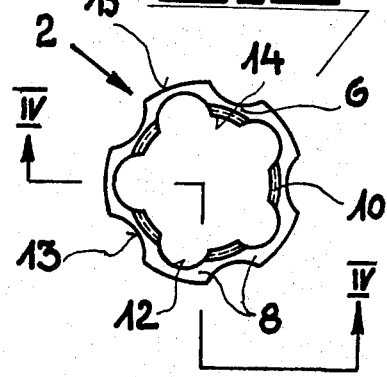
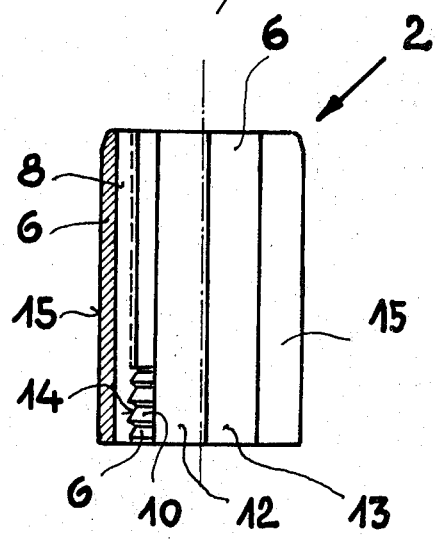

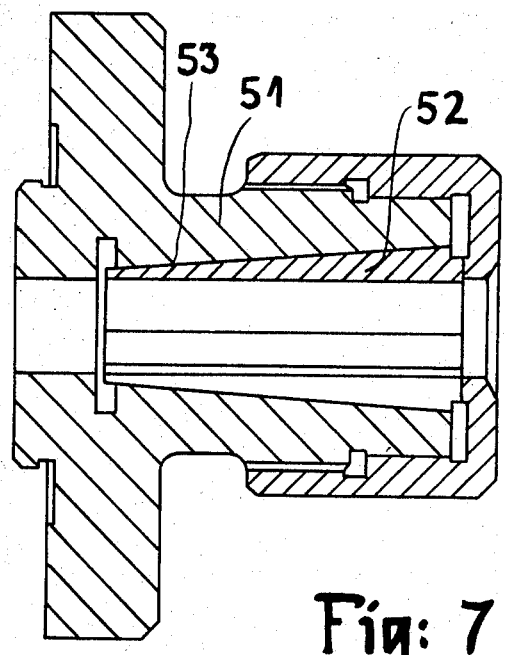
Fig: 7

United States Patent Office 3,534,970
Patented Oct. 20, 1970

3,534,970
SELF-LOCKING FIXTURES
Richard Glimpel, Lauf (Pegnitz), Germany, assignor to Firma Emuge-Werk Richard Glimpel, Lauf (Pegnitz), Germany, a company of Germany
Filed Apr. 22, 1968, Ser. No. 723,048
Claims priority, application Germany, Apr. 27, 1967, E 33,888
Int. Cl. B23b 31/40
U.S. Cl. 279—2                                          6 Claims

ABSTRACT OF THE DISCLOSURE

A self-locking fixture using a radially deformable sleeve which is capable of being expanded into a hole or compressed onto the outside of a pin in order to hold the fixture firmly to another body. The sleeve utilizes arcuately spaced thrust-transmitting strips interconnected throughout their lengths by arcuately deformable webs which flex to accommodate an arcuate change in shape of the sleeve when the fixture is locked in position.

BACKGROUND OF THE INVENTION

This invention relates to a fixture which may be used to clamp a workpiece or a tool to a tool machine. More specifically, the fixture is composed of parts which can be moved relatively to one another to change the shape of the fixture so that it tightly grips the workpiece or tool whereby they are rigidly held to the machine by the fixture.

Self-locking fixtures utilizing a longitudinally split sleeve are known. The sleeve is longitudinally split at one end portion to provide fingers which are forced apart when a pin is driven into one end of the sleeve so that the peripheries of the fingers tightly grip the edges of a hole through which the fixture is fitted.

Although a fixture using a longitudinally split sleeve is convenient to manufacture, it has the disadvantage of allowing matter to pass through the slits. Such matter can contaminate the inside surfaces of the sleeve which are to co-operate with the pin and this can result in less effective clamping than is obtained if the inside surfaces of the sleeve are clean.

An object of this invention is the provision of an improved self-locking fixture.

SUMMARY OF THE INVENTION

A self-locking fixture in accordance with a broader aspect of this invention comprises a rigid body having a ramp surface of circular cross-section; a sleeve of substantially incompressible radial thickness formed with arcuately spaced and axially extending strips for transmitting thrust radially between two groups of bearing surfaces arcuately spaced around the inside and outside of the sleeve, respectively; two group of arcuately and axially extending webs spanning through their length between the strips of the sleeve to accommodate changes in sleeve diameter; ramp surfaces formed on one of the groups of bearing surfaces and positioned to engage the ramp surface of the body; and a displacement member adjustable on the body to displace the sleeve axially relative to the body and so produce a wedging sliding movement of the ramp surfaces of the sleeve and body over one another to change the sleeve diameter; one of said groups of the wedge means forming the bearing surfaces around the inside surface of the sleeve; the other of the group of wedge means forming the bearing surfaces around the outside surface of the sleeve; and one of the groups of wedge means having the ramp surfaces. The ramp surfaces of the sleeve and body are preferably of complementary profile.

The ramp surface of the body is conveniently formed by making it of frusto-conical shape. Where the sleeve is to be compressed in diameter by the wedging action, the body ramp surface is suitably formed as a tapering bore in the body, with the wider diameter end of the bore being disposed adjacent the displacement member. Each of the strips of the sleeve is then provided with a progressively diminishing radial thickness along its length while the sleeve bore is of uniform diameter throughout its length.

If the sleeve is to be expanded by the body, then the strips of the sleeve have a progressively changing radial thickness along their lengths produced by providing the sleeve with a tapering bore which fits over the body, and an external diameter of uniform cross-section for gripping the inside surface of an opening into which the fixture is to be fixed.

An advantage of the present fixture is that it enables the change in diameter of the sleeve to take place uniformly throughout the length of the sleeve so that a pair of cylindrical surfaces with which the fixture co-operates can be rigidly clamped to the fixture and thus to one another. It will be appreciated that when a longitudinally split sleeve is used to clamp two members to one another, the clamping of one of the members to the sleeve is generally very much more effective than the clamping of the other member to the sleeve and consequently a looseness of the connection between the members is often experienced.

The fixture may have the sleeve internally toothed and the body externally toothed, or, if desired, the sleeve externally toothed and the body internally toothed. It is preferred to use an internally toothed sleeve where the fixture is to be passed through a hole in the workpiece or tool to be clamped. The second arrangement of fixture which relies on the sleeve being externally toothed is preferable when the sleeve is to be compressed onto a cylindrical pin by relative movement of the body and sleeve.

The displacement member conveniently takes the form of a nut threaded onto one end of the body and having a flange which engages an end rim of the sleeve. By drawing up the nut on the body, the desired axial displacement of the sleeve takes place.

An advantage of the present fixture is that the sleeve is not slit in any way so that there is no danger of foreign matter passing through the slits and interfering with the tight engagement of the toothed surfaces of the body and the sleeve. During change in diameter of the sleeve when in use, the thrust-transmitting and incompressible strips move substantially radially while the arcuate deformation of the sleeve which takes place simultaneously with its change of diameter is accommodated by the webs which may flex or cant to allow the strips to move slightly apart.

The invention will now be described in more detail, by way of examples, with reference to the accompanying drawings, in which:

BRIEF DESCRIPTION OF THE DRAWINGS

FIG. 1 shows a self-locking fixture in side elevation with parts broken away to expose interior detail;

FIGS. 2 and 3 respectively show two views of a preferred form of sleeve, with FIG. 2 showing the sleeve in partial section as taken on the line II—II in FIG. 3, the view looking in the direction of the arrows and FIG. 3 is an axial view of the sleeve;

FIGS. 4 and 5 correspond to FIGS. 2 and 3 but show a second form of sleeve;

FIG. 6 is a longitudinal section of a second form of self-locking fixture; and,

FIG. 7 is a longitudinal section of a third form of self-locking fixture.

DETAILED DESCRIPTION OF THE INVENTION

The self-locking fixture of FIG. 1 has a rigid solid body 1 integrally formed with a stub shaft 20 at one end provided with a key-way 21. The other end of the body 1 is provided with a threaded shank 3 on which is threaded a nut 4 having a radial flange 5.

The body 1 has an intermediate generally cylindrical portion 22 which is formed with a first set of axially spaced annular teeth 9 of saw-tooth configuration. The intermediate portion 22 is embraced by a snugly fitting expandible sleeve 2 internally formed with a second set of teeth 14 of complementary shape to the teeth of the portion 22. Opposite marginal edges 23 of the sleeve 2 project slightly beyond opposite end portions of the intermediate portion 22. A grub screw 24 is threaded radially into the body portion 22 so that its head protrudes into a short opening 25 in the sleeve 2 so dimensioned as to permit axial displacement of the sleeve 2 on the portion 22 of slightly less than one tooth pitch. As a result of the saw tooth configuration of the two sets of teeth, the teeth on the portion 22 provide ramp surfaces which are slidably engaged by complementary ramp surfaces formed on the set of teeth of the sleeve 2.

FIG. 2 and 3 show the construction of the sleeve 2 in more detail. As shown in FIG. 3 the sleeve, in its developed form, is of castellated shape and is provided internally with a group of inwardly directed bearing surfaces 10, and externally with a group of outwardly directed bearing surfaces 15, with said bearing surfaces being formed on axially extending web means 6. Between the two groups of bearing surfaces, the sleeve is formed with arcuately spaced and axially extending rigid strips 8 for transmitting thrust in a radial direction between the two groups of bearing surfaces. The web means 6 span between the rigid strips 8. The inner group of bearing surfaces 10 has the second set of teeth 14 formed thereon. The castellations are separated by gaps 13 which are small as compared with the spacing between the pair of sides of each castellation.

The fixture of FIG. 1 is used as follows: The fixture, with the sleeve arranged as shown in FIG. 1, is loosely fitted inside a hole of a work-piece or tool. The body 1 is held by a suitable tool machine applied to the stub shaft 20, and the nut 4 is drawn up so that its radial flange 5 bears on the end rim of the sleeve 2. The pressure of the flange 5 forces the sleeve axially in the direction of the stub shaft 20 thereby causing the complementary ramp surfaces to slide over one another so that the diameter of the sleeve is expanded. The outer bearing surfaces 15, as shown in FIG. 3, are thus forced into intimate contact with the registering bores by the incompressible thrust-transmitting strips 8. An extremely strong connection between the workpiece and tool machine is thus obtained and the sleeve 2 exerts a radial gripping thrust on the workpiece each which is effective throughout the length of the sleeve 2. The movement of the sleeve along the portion 22 is limited by the axial length of the opening 25 so that there is no risk of the sleeve moving through a distance sufficient to cause the sliding ramp surfaces to pass one another.

FIG. 6 shows a self-locking fixture comprising a rigid hollow body 31 having a radial flange 59 at one end provided with a countersunk bolt hole 26. An intermediate portion 27 of the body is externally threaded to retain in place a hollow cap nut 35 internally threaded at 34. The cap nut 35 has its inner rim 28 provided with an axial flange 29.

The body 31 is provided internally over the greater part of its length with a cylindrical surface having axially-spaced annular teeth 39 of saw-tooth profile. Snugly fitting inside the toothed portion of the body is a hollow sleeve 32 held in place by a radial grub screw 33 which is threaded into the body 31 so that its tip 37 engages in an opening 49 on the sleeve 32. The engagement of the tip 37 in the opening 49 provides a pin and opening arrangement limiting axial movement of the sleeve 32 in the body 31 to a distance substantially less than the pitch of the teeth 39.

The sleeve 32 is formed by a number of arcuately spaced and axially extending strips 36 and provides an outer group of bearing surfaces 44 and an inner group of bearing surfaces 45. The strips 36 are relatively incompressible and are interconnected by webs 38 throughout their lengths. A second set of teeth 40 of complementary profile to the teeth 39 are provided on the bearing surfaces 44. The sleeve 32 is externally toothed and the rigid body 31 is internally toothed.

The fixture shown in FIG. 6 is used as follows. A pin to be gripped in the chuck is a loose fit inside the sleeve 32 which has a smaller internal diameter than the cap nut 35. The cap nut 35 is now drawn up so that its flange 29 abuts on the end rim of the sleeve 32 and forces it axially into the body 31. The sleeve-accommodating space in the body is shaped to permit limited axial movement of the sleeve 32 therein, with such movement being limited by abutment of opposite end 48 of the sleeve with a shoulder in the body and by the pin and opening slot arrangement so that axial movement of the sleeve 32 is limited to a distance substantially less than one tooth pitch. During the axial displacement of the sleeve in the body produced by the cap nut 35, the inclined ramp surfaces of the two sets of teeth slide over one another causing a contraction of the inside diameter of the sleeve onto the pin which is therefore firmly gripped. The relatively incompressible strips provide a firm unyielding grip of the pin as a result of the wedging action of the two sets of teeth sliding over one another.

FIGS. 4 and 5 show an alternative form of clamping sleeve to that described with reference to FIGS. 2 and 3. In the sleeve of FIGS. 4 and 5 corresponding parts are similarly numbered. The sleeve provides an inner group of bearing surfaces 10 spaced from one another by axially extending part-cylindrical channels 12. The bearing surfaces 10 are provided with teeth having a saw-tooth profile in the same way as the teeth 14 in FIG. 3.

The outer surface of the sleeve 2 is scalloped to provide shallow axially extending troughs 13 between an outer group of bearing surfaces 15. The arrangement is such that the longitudinal axes of the channels 12 are centered on radial planes which lie mid-way between the center lines of the troughs 13 which overlap with their marginal edges the marginal edges of the channels 12. The amount of overlap is such that the corner edges of the troughs 13 lie substantially on the same radial line as the corner edges of the channels 12 so that the regions 8 of the sleeve 2 lying on these radial lines effectively provide arcuately spaced and axially extending thrust-transmitting strips which are relatively incompressible. It will be appreciated that when the sleeve shown in FIG. 5 is expanded outwardly by movement of the nut 4 of FIG. 1, the outer group of bearing surfaces 15 are forced by the strip-like regions 8 into intimate contact with the interior of a bore into which the device is fitted.

In the above examples of the invention, the sleeves are made of a suitable material, preferably metal, which is strong in compression and yet is capable of yielding sufficiently to a bending moment to allow peripheral expansion or contraction of the sleeve without damage.

With the arrangement of sleeve shown in FIGS. 2 and 3, the channel widths are each a whole number multiple of the widths of the gaps 13 and thus a very large part of the outer peripheral surface of the sleeve 2 provides an effective abutment for engaging the surface of a bore into which the fixture is placed. In practice, the channel widths are of approximately the same width as the widths of the bearing surfaces 10 of the inner group. This is also the case with the embodiment of sleeve shown in FIG. 5. In the sleeve of FIG. 5, the widths of the shallow troughs 13 formed by the scalloping are approximately the same as the widths of the bearing surfaces of the outer group. Only about two-thirds of the periphery of the sleeve provides the outer group of abutment surfaces. Thus, referring to FIG. 5, any circle which is coaxial with the sleeve and whose radius lies between the radii of the two groups of bearing surfaces will either pass through the channels 12 or the troughs 13. None of these circles will lie completely in the sleeve itself.

The embodiment shown in FIG. 7 will be recognized as being basically similar to that shown in FIG. 6. In the embodiment of FIG. 7, the teeth are omitted and instead bore 53 of a chuck 51 is of outwardly flaring frusto-conical shape. A sleeve 52 has strips and webs alternating with one another and is provided with a uniform internal diameter while its external diameter tapers along its length to provide, on the strips of the sleeve, external, arcuately spaced ramp surfaces of complementary profile to the ramp surface provided by the tapered bore of the chuck. The cap nut is the same as that shown in FIG. 6 and it operates in similar manner to mount the fixture in position.

I claim:

1. A fixture comprising a rigid body having a cylindrical surface; axially spaced annular teeth of sawtooth profile defining a first set on said surface; an axially unsplit sleeve of substantially incompressible radial thickness; thrust-transmitting incompressible strips arcuately spaced about said sleeve and parallel to the longitudinal axis thereof; two groups of arcuately-spaced bearing surfaces around the inside and outside surfaces of said sleeve, respectively; a second set of teeth on said sleeve having a profile complementary to the teeth of said first set; ramp surfaces formed on said teeth by said saw-tooth profile; a displacement member adjustable on said body to displace said sleeve axially thereon to slide said ramp surfaces over one another to produce diametric deformation of said sleeve; two groups of arcuately and axially extending web means integral with said sleeve and spanning between said strips throughout their length to accommodate changes in sleeve diameter; one of said groups of said web means defining said bearing surfaces formed around said inside surface of said sleeve; the other of said groups of said web means defining said bearing surfaces formed around said outside surface of said sleeve; and one of said groups of said web means having said second set of teeth formed thereon.

2. A fixture comprising a rigid body having a cylindrical surface; a first set of annular axially spaced teeth of saw-tooth profile on said surface; an axially unsplit sleeve of substantially incompressible radial thickness; thrust-transmitting strips extending longitudinally of said sleeve and arcuately spaced thereon; two groups of bearing surfaces arcuately spaced around the inside and outside surfaces of said sleeve, respectively, and between which said strips extend substantially radially; a second set of teeth on said sleeve; said second set of teeth having a profile complementary to the teeth of said first set; ramp surfaces formed by said saw-tooth profile of said teeth; a displacement member defined by a nut threadedly engaging said body; a flange on said nut and engaging one end of said sleeve to produce axial displacement thereof with rotation of said nut towards said sleeve with axial movement of said sleeve on said body sliding said ramp surfaces over one another to produce diametric change in shape of said sleeve; two groups of axially extending web means spanning between said strips throughout their length and arcuately expanding to accommodate changes in sleeve diameter; one of said groups of web means defining said bearing surfaces formed around said inside surface of said sleeve; the other of said groups of said web means defining said bearing surfaces formed around said outside surface of said sleeve; and one of said groups of said web means having said second set of teeth formed thereon.

3. The fixture as set forth in claim 1 in which said sleeve is externally scalloped to provide shallow troughs extending axially between the bearing surfaces of the outside group, and in which the bearing surfaces of the inside group are mutually spaced by axially-extending part-cylindrical channels having their longitudinal axes centered on radial planes lying mid-way between the center lines of the troughs the marginal edges of which are overlapped by the marginal edges of said channels.

4. The fixture as set forth in claim 1, in which said sleeve in developed cross-section is of castellated form and the gaps between successive castellations are smaller than the widths of the castellations and extend radially inwardly from the outside surface of said sleeve.

5. A fixture comprising a rigid body having a ramp surface of circular cross-section; an axially unsplit sleeve of substantially incompressible radial thickness; thrust transmitting incompressible strips arcuately spaced about said sleeve and parallel to the longitudinal axis thereof; two groups of arcuately spaced bearing surfaces around the inside and outside surfaces of said sleeve, respectively; ramp surfaces on one of said groups of bearing surfaces and disposed to slide against said ramp surface of the rigid body; a displacement member adjustable on said body to displace the sleeve axially and deform the sleeve radially by wedging action of said ramp surfaces sliding against one another; two groups of arcuately and axially extending web means integral with said sleeve and spanning between said strips to accommodate changes in sleeve diameter; one of said groups of said web means defining said bearing surfaces formed around said inside surface of said sleeve; the other of said groups of said web means defining said bearing surfaces formed around said outside surface of said sleeve; and one of said groups of said web means having said ramp surfaces.

6. The fixture as set forth in claim 5, in which the ramp surfaces of the sleeve are, in profile, complementary to the ramp surface of said body.

References Cited

UNITED STATES PATENTS

| 2,859,041 | 11/1958 | Sloan | 279—2 |
| 3,111,327 | 11/1963 | Ruehl | 279—2 |
| 3,117,797 | 1/1964 | Buck | 279—2 |

ROBERT C. RIORDON, Primary Examiner

D. D. EVENSON, Assistant Examiner

U.S. Cl. X.R.

279—51